United States Patent [19]
Peter

[11] Patent Number: 5,493,462
[45] Date of Patent: Feb. 20, 1996

[54] DISK DRIVE HAVING AN INWARDLY RADIALLY SPRING LOADED HARD RING DISK PACK ATTACHMENT TO THE DISK MOTOR ROTOR

[75] Inventor: Gary M. Peter, Boise, Id.

[73] Assignee: Hewlett-Packard Company, Palo Alto, Calif.

[21] Appl. No.: 253,634

[22] Filed: Jun. 3, 1994

[51] Int. Cl.⁶ .......................... G11B 17/022; G11B 17/02
[52] U.S. Cl. ...................... 360/99.12; 360/98.08
[58] Field of Search ............................ 360/98.08, 99.12

[56] References Cited

U.S. PATENT DOCUMENTS

| | | | |
|---|---|---|---|
| 4,945,432 | 7/1990 | Matsudaira et al. | 360/133 |
| 5,075,808 | 12/1991 | Johnson | 360/98.08 |
| 5,101,306 | 3/1992 | Johnson | 360/58.08 |
| 5,249,090 | 9/1993 | Fehse | 360/99.12 |
| 5,317,225 | 5/1994 | Miyaji | 360/98.08 |
| 5,367,918 | 11/1994 | Chessman et al. | 360/99.12 |
| 5,422,768 | 6/1995 | Roehling et al. | 360/99.12 |
| 5,426,548 | 6/1995 | Fujii et al. | 360/99.12 |

FOREIGN PATENT DOCUMENTS

0597187  5/1994  European Pat. Off. .

Primary Examiner—Robert S. Tupper
Assistant Examiner—David D. Davis
Attorney, Agent, or Firm—E. F. Oberheim

[57] ABSTRACT

A hard disk pack assembly is attached to a motor powered rotatable member in a disk drive by a spring ring. A disk hub mounts one or more disks, functioning as an axial disk spacer when more than one disk is installed. The disk hub has a central circular opening fitted about a cylindrical body on the rotatable member and seats upon a shoulder on the cylindrical body. A spring ring snaps radially inwardly into a circumferential groove in the cylindrical body in a position wedged between surface of the circumferential groove and an upper circular edge of the circular opening in the disk hub to apply axial and radial components of spring force to the disk hub for the purpose of securely seating the disk hub on the shoulder of the cylindrical body and to center the disk hub with respect to the cylindrical body.

7 Claims, 7 Drawing Sheets

DISK DRIVE HAVING AN INWARDLY RADIALLY SPRING LOADED HARD RING DISK PACK ATTACHMENT TO THE DISK MOTOR ROTOR

TECHNICAL FIELD

This invention relates generally to hard disk drives and particularly to hard disk drives having removable hard disk pack assemblies.

BACKGROUND OF THE INVENTION

Disk pack assemblies in hard disk drives are usually fixed in place and are not removable. Dimensional tolerances with respect to disk flatness, wobble and runout in hard disk drives usually negate the use of disk pack assemblies in cartridges which may be installed and removed from the disk motor shafts or rotors. This is particularly true in small form factor drives, 2.5 form factor and less, where dimensional tolerances in conventional cartridge assemblies exceed acceptable tolerances in the small form factor drives.

Thus, typically, hard disk drive disk pack assemblies, as seen in the U.S. Pat. No. to Matsudiara et al 4,945,432, are fixed disk pack assemblies in which the disks are axially stacked, with spacer rings between them, upon a hub, which hub may be a part of a motor rotor, and clamped between a shoulder at one end of the hub and a clamp at the other. There is no provision for removing the hub.

The U.S. Pat. No. to Angel et al 3,587,074, illustrates a disk pack assembly embodying a single disk clamped between a shoulder on a disk hub and a clamping ring. A motor shaft is journaled in a coaxial bearing pair. The disk hub is secured to the end of the motor shaft by a single screw. If the disk drive housing could be split, removal of the screw would possibly permit removal of the single disk.

The attachment of a disk pack assembly to a motor shaft or motor rotor involves critical dimensional tolerances. The slip fit of a disk hub about a motor shaft or within or about some part of a motor rotor, as in Angel et al, does not meet dimensional tolerances in small form factor drives, absent some centering arrangement associated with securing the disk pack assembly to some rotating part of the motor, as the motor shaft or the motor rotor.

SUMMARY OF THE INVENTION

The hard disk assembly according to this invention includes a hub which mounts at least one disk. The hub has a central circular opening which fits over the cylindrical body of a member, such as a motor rotor or shaft, or, other rotatable member, powered by a motor in a disk drive. The hub seats upon a peripheral shoulder or flange on the cylindrical body. A circumferential groove in the cylindrical body has an upper conical groove surface spaced above the upper surface of the hub. A spring ring of a hard material, such as a metal ring, has an expandable inner diameter which when expanded fits over the outer diameter of the cylindrical body and snaps into the circumferential groove, wedging between the upper conical groove surface and the hub, to apply a component of force seating the hub securely upon the flange and, to additionally apply a radial component of force centering the hub with respect to the cylindrical body.

The spring rings having expandable inner diameters may take several forms.

One form being a ring of spring sheet material of inverted V-shaped cross section, having inner and outer conical faces, the inner conical face being defined by a plurality of radial fingers, the distal ends of which are radially deflectable and displaceable to clear the diameter of the cylindrical body and snap into the circumferential groove to engage the upper conical surface of the circumferential groove, in which position the outer peripheral edge of the ring seats in a circumferential groove in the upper face of the hub, forcing the hub against the peripheral shoulder of the cylindrical body and radially centering the hub.

Another form of spring ring being of a material of solid cross section, disclosed cross sections being circular and wedge shaped. Such solid rings are split rings permitting expansion or enlargement of their inner diameter to clear the diameter of the cylindrical body and to snap into position in the circumferential groove, in a position wedged between the upper conical surface of the circumferential groove and the upper circular edge of the circular opening in the disk hub. The solid split ring applies both axial and radial forces to the hub to seat the hub on the peripheral shoulder and to center the hub with respect to the cylindrical body.

DESCRIPTION OF THE DRAWINGS

The invention will be better understood by reference to the following specification when considered in conjunction with the accompanying drawings, in which.

DESCRIPTION OF THE PREFERRED EMBODIMENTS

Figure 1:
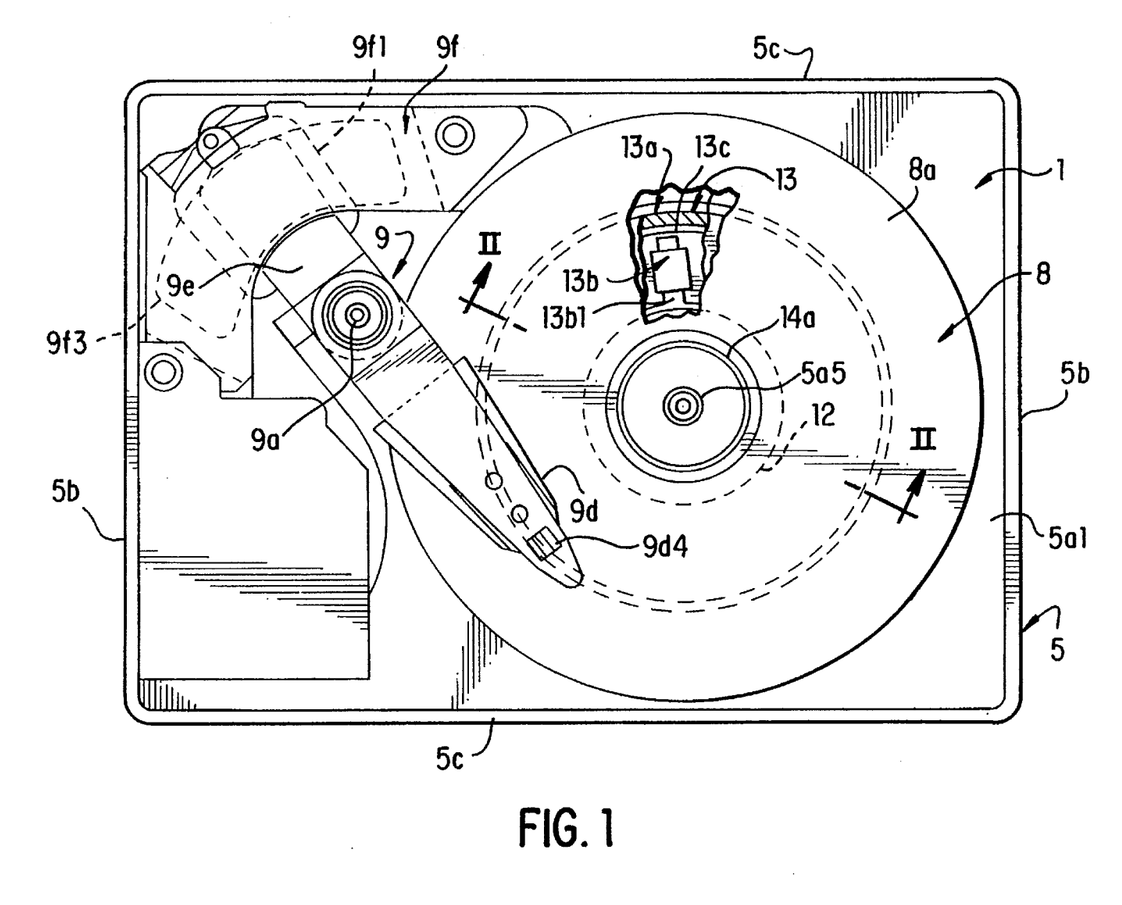
FIG. 1 is a plan view of a disk drive having a disk assembly embodying the principles of this invention.
Figure 2:
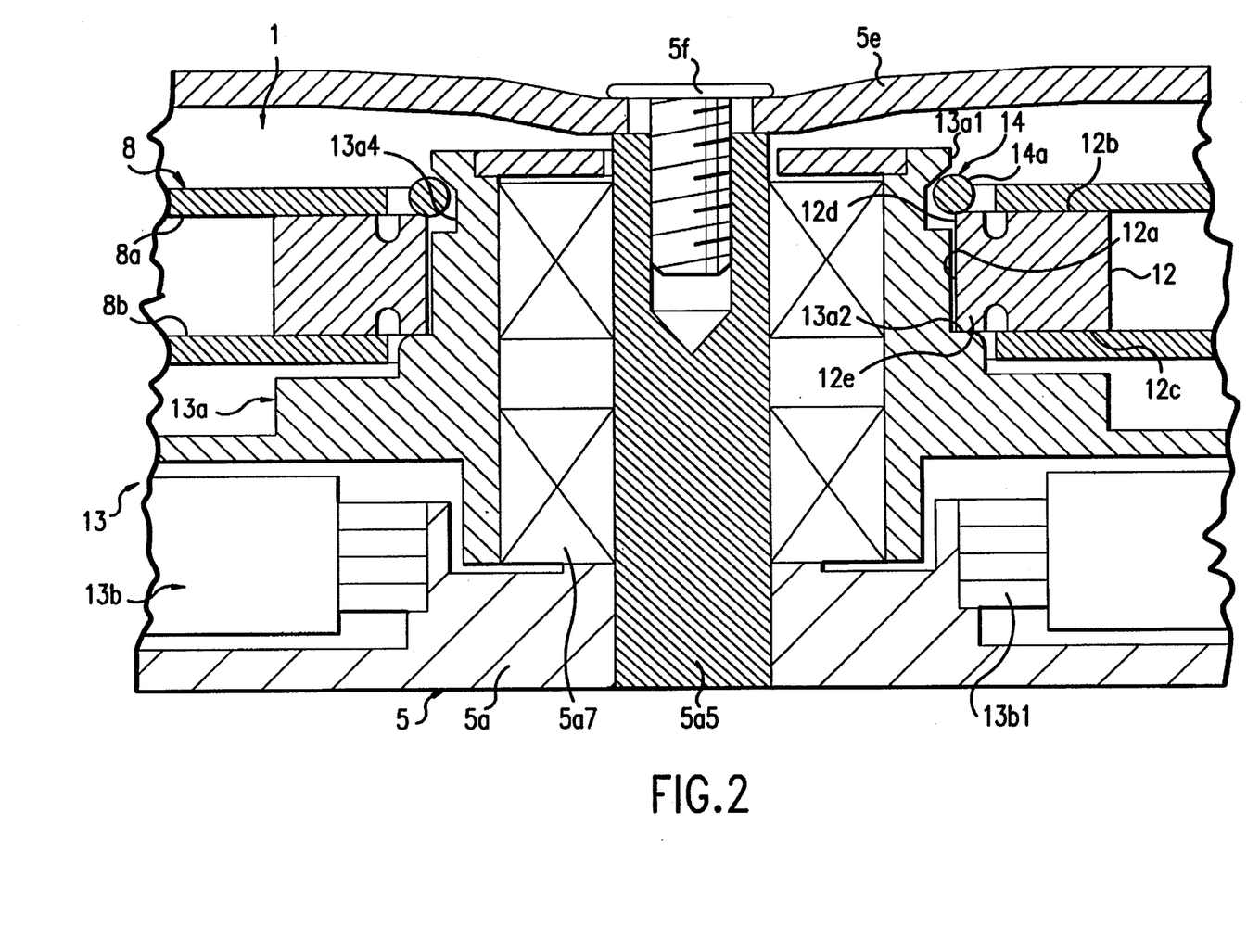
FIGS. 2 and 3 are enlarged cross sectional views of a disk hub assembly such as that of FIG. 1, depicting a first embodiment of this invention.
Figure 3:
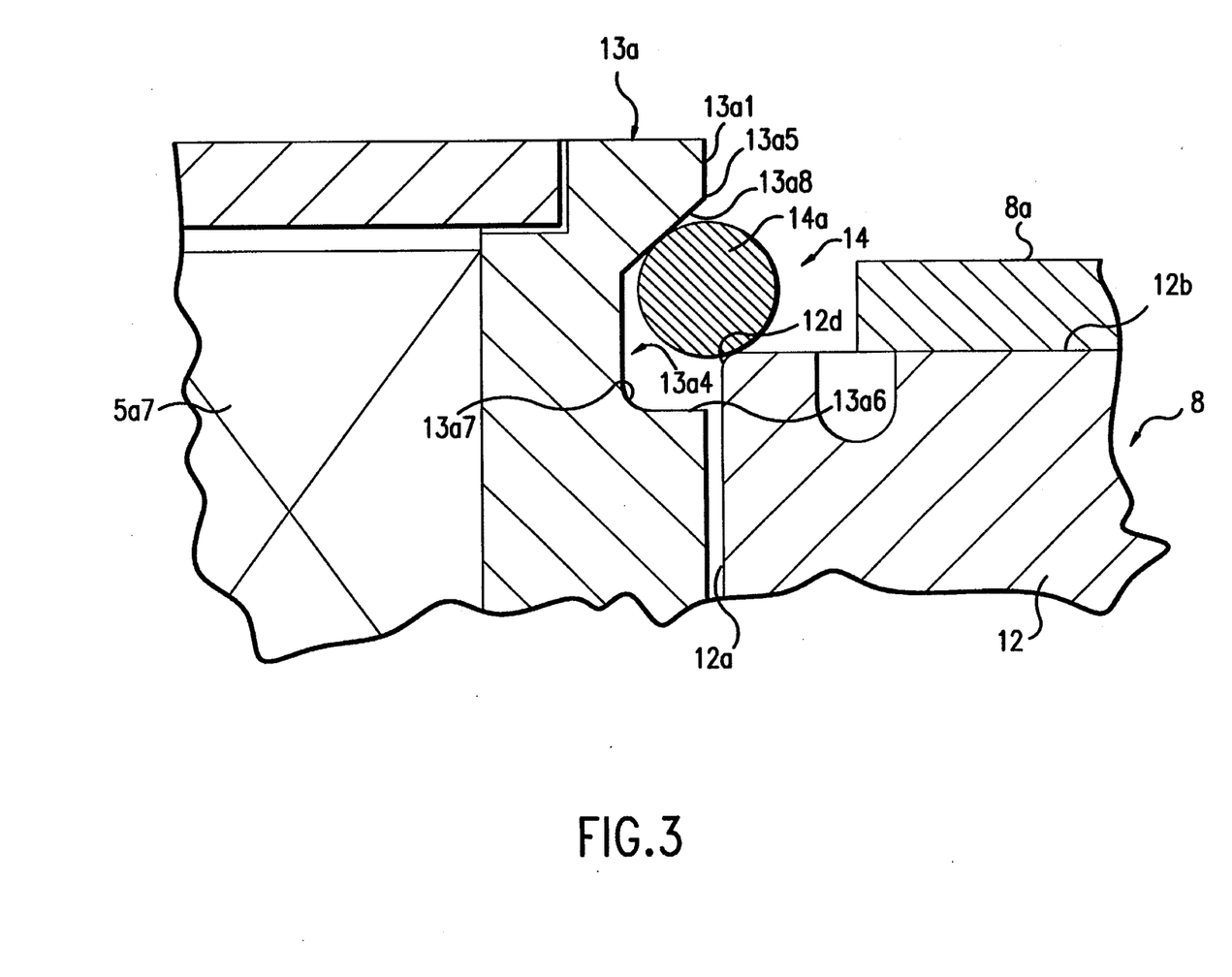

FIGS. 1–3 provide plan and section views of one embodiment of this invention. These figures, while depicting the structure of a small form factor (1.3 form factor, for example), hard disk drive 1, should not be construed as limiting this invention in its application to a disk drive or to any particular size of disk drive. Typically these figures are drawn to an enlarged scale, FIG. 2, taken in the section plane II—II of FIG. 1, being an enlargement of FIG. 1, and FIG. 3 being a further enlargement of a fragmentary portion of FIG. 2, to permit the illustration of essential detail. In FIGS. 1 and 2, the disk drive 1 comprises a main frame or base structure 5 of metal, such as aluminum, which is the backbone, i.e., the primary structural member of the disk drive structure. The base structure 5 is preferably of a single piece of milled or cast metal which is precision machined, having a base plate 5a with integral end walls 5b and side walls 5c, FIG. 1.

Since the electrical function of this disk drive is not necessary to an understanding of this invention, the printed circuit assembly, comprising the disk controller for the disk drive, is not shown.

A cover 5e, FIG. 2, is secured as by adhesive bonding, to the upper edges of the end walls 5b and the side walls 5c of the base structure or mainframe 5 to seal and further stiffen the assembly.

The hard disk drive 1 comprises a hard disk assembly 8 and a rotary actuator assembly 9.

The rotary actuator assembly 9 is journaled on the spindle 9a secured in the base 5a and comprises two arm structures 9d, one above and one below the hard disk assembly 8. Each arm structure mounts a transducer, such as a magnetic head 9d4 at its distal end, in a position confronting a surface of the disk 8a. Only the upper arm structure 9d is seen in the drawings, appearing only in FIG. 1. An actuator motor arm 9e mounts a coil 9f1 of an axial gap actuator motor 9f. The electromagnetic field of the coil 9f1 links the magnetic field of a permanent magnet structure 9f3 mounted to the base structure 5. As is known, the coil 9f1 is reversibly energized to move the rotary actuator 9 bi-directionally about the spindle 9a to move the transducer to different radial locations with respect to the surface of a disk 8a of the disk assembly 8.

The hard disk assembly 8 comprises a disk spacer or hub 12 having a central circular opening 12a, FIGS. 2 and 3, top and bottom axial faces 12b and 12c to which disks 8a and 8b, respectively, are adhesively bonded, and upper and lower circular edges 12d and 12e respectively of the circular opening 12a.

In FIGS. 1 and 2, the disk motor 13 is a radial gap motor having a salient pole stator 13b, FIG. 1, the magnetic poles 13b1 of which are mounted directly to the base structure 5 beneath the motor rotor 13a. The outer ends of the salient poles 13b1 of the stator, one being shown in FIG. 1, define a radial gap with a permanent magnet ring 13c disposed within the rim of the rotor, the permanent magnetic ring 13c being radially spot magnetized in alternating polarity in equally spaced circumferential positions thereabout, defining a number of permanent magnet poles greater (or less)in number than the number of salient poles. The disk motor rotor 13a is of a magnetic flux conducting material such as steel and forms the flux return path for the radially poled permanent magnet poles in the permanent magnet ring 13c.

High data volume demands in the smallest possible volume of mechanical packaging, regardless of the form factor size, result in limited space within the disk drive housing for various mechanical structures. Thus, any simplification of the mechanical design which eliminates parts or which simplifies the fabrication of the disk drive, becomes a requirement for fabrication of the drive. In a structure of the type of FIG. 2, for example, a simplification which is presently used in the fabrication of the disk drive employs an adhesive bond between the hard disks 8a and 8b and the hub 12 at the hub surfaces 12b and 12c. Employing this adhesive bonding as the sole means of attaching the hard disk 8a and 8b to the disk hub 12, eliminates any need for mechanical devices of the type employed by Matsudaira et al to clamp the hard disks to the dish hub. Other attachments, such as that attachment disclosed in the applicant's related copending application, referenced hereinabove, are applicable here.

As seen in the cross sectional views of FIGS. 2 and 3, the circular opening 12a of the disk hub 12 is fitted over a concentric cylindrical body 13a1 of the motor rotor 13a and seats upon a shoulder 13a2. Neither of the disks 8a, 8b, contact the motor rotor. A circumferential groove 13a4 is formed in the cylindrical body 13a1. The circumferential groove 13a4 has an upper circumferential groove edge 13a5, a lower circumferential groove edge 13a6, a circumferential groove bottom 13a7, and an upper conical groove surface 13a8 sloping downwardly and inwardly of the cylindrical body 13a1 from the upper circumferential groove edge 13a5 to the circumferential groove bottom 13a7. The lower circumferential edge 13a6, FIG. 3, of the circumferential groove 13a4 is positioned below the upper surface 12b of the hub 12. The upper conical surface 13a8 of the circumferential groove 13a4 slopes downwardly and inwardly in the cylindrical body 13a1, as best seen in the enlarged cross sectional view of FIG. 3, in a position above the hard disk assembly 8. A toroidal split spring ring 14 of metal having a body of circular cross section, is seated in the circumferential groove 13a4. The split ring 14 is of lesser plan form diameter than the diameter of the cylindrical body 13a1. The circular cross section of the body of the spring ring 14 has a diameter of greater dimension than the dimension between the upper conical groove surface 13a of the circumferential groove 13a4 and the upper circular edge 12d of the circular opening 12a in the disk hub 12. The spring ring is spread open, using a tubular mandrel or spring ring pliers and is slipped over the upper end of the cylindrical body 13a1 and snapped into the circumferential groove 13a4. When installed, the spring bias of the spring ring 14, as best seen in FIG. 3 has an inwardly directed radial force component which draws the circular spring body 14a into the circumferential groove 13 where it is jammed or wedged between the upper conical groove surface 13a8 of the circumferential groove 13a4 and the upper circular edge 13d of the circular opening 12a in the disk hub 12. In this position, the spring ring 14 applies radial and axial force components to the disk hub 12, centering the disk hub with respect to the cylindrical body 13a1 and securely seating the disk hub 12 against the shoulder or flange 12e on the cylindrical body 13a1, in secure static frictional engagement therewith. The disk hub 12 is further secured to the cylindrical body 12a2 by the static friction coupling between the disk hub 12 and the cylindrical body 13a1 provided by the split ring 12a7. The essential features of the circumferential groove reside in the upper conical groove surface 13a8, the disposition of the lower circumferential groove edge 13a6 sufficiently below the upper circular edge 13d of the circular opening in the disk hub 12, and the depth of the circumferential groove to the groove bottom 13a7, both for the purpose of clearing the circular body cross section 14a of the split ring 14. Thus, it will be appreciated that other cross sectional configurations may be employed, the cross section of the circumferential groove 12a4 disclosed representing the presently preferred design.

The split ring 14 has a circular body 14a of a cross sectional diameter which is greater than the minimum dimension between the conical groove face 13a8 and the edge 12d of the central circular opening 12a of the disk hub 12. The cross section diameter of the circular body 14a of the split ring 14 is chosen to achieve optimum split ring penetration into the circumferential groove 13 without contacting the groove surfaces other than the upper conical groove surface 13a8.

Figure 4:
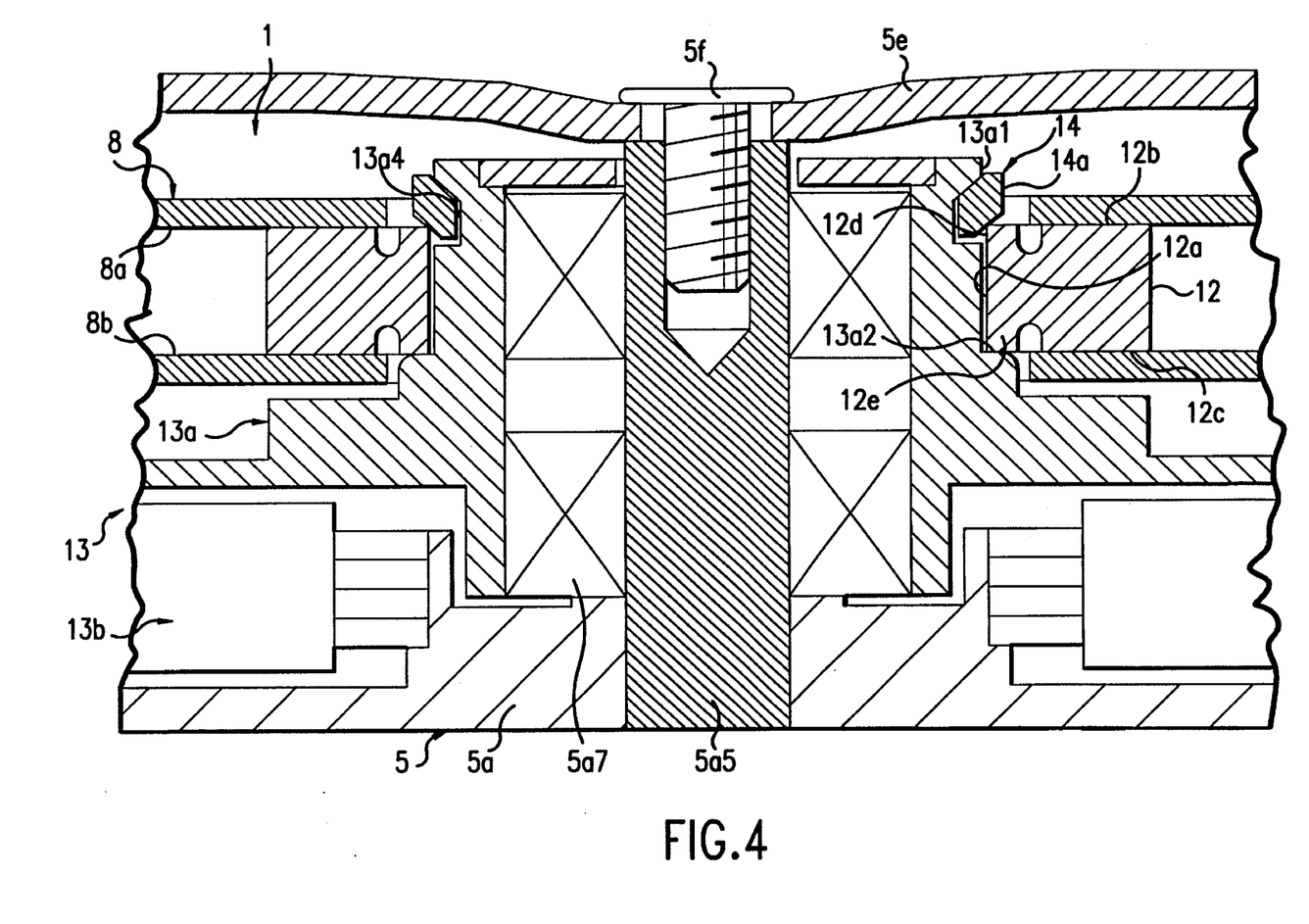
FIGS. 4 and 5 are enlarged cross sectional views of a disk hub assembly such as that of FIG. 1, depicting a second embodiment of this invention.
Figure 5:
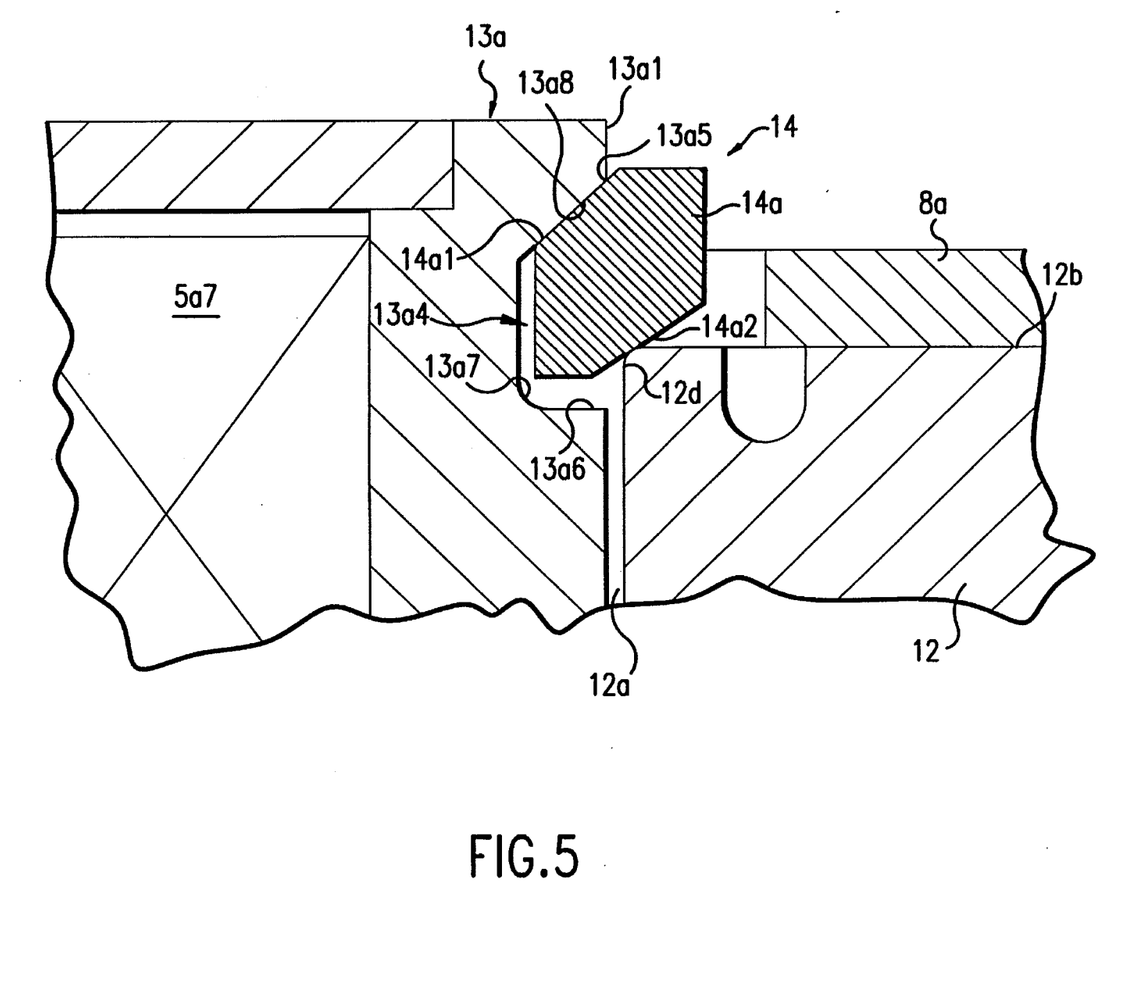

FIGS. 4 and 5 show a second embodiment of this invention. Parts in these figures corresponding to those of FIGS. 1, 2 and 3 bear like reference characters. FIGS. 4 and 5 illustrate a split spring ring body 14a of wedge shaped cross-section. The key features of this wedge shaped split ring 14 reside in the upper conical surface 14a1 and the lower conical surface 14a2. Attention is directed to the difference in slope of these respective conical surfaces the angles of these conical surfaces with respect to a horizontal plane being different, that for the upper conical surface 14a1 being greater than that for the lower conical surface. Comparing these respective angles with FIG. 3, for example, it will be seen that the angle of the conical surface 14a1 corresponds essentially to the tangent of the angle at the point of contact of the circular body 14a of the split ring of FIG. 3 with the upper conical surface 13a8 of the cylindrical member 13a. Similarly, the angle of the lower conical surface 14a2 of the wedge shaped split ring 14 of FIG. 5 corresponds closely to the tangent of the angle defined between the point of contact of the circular body 14a of the split ring of FIG. 3 with the upper circular edge 12d of the circular opening 12a in FIG. 3. The inner and outer circumferential surfaces of the wedge shaped split ring 14 are trimmed as shown to avoid interference, respectively, with the groove bottom 13a7 and the disk 8a. Similarly, the bottom face of the wedge shaped split ring 14 is trimmed so that it clears the bottom edge 13a6 of the circumferential groove 13a4. As in the case of the toroidal split ring 14 of FIGS. 4 and 5, the wedge shaped split ring 14 of FIG. 5 applies radial and axial components of split ring force to the disk hub 12 to securely seat the disk hub on the shoulder 13a2 on the cylindrical body 13a1 and to center the disk hub 12 with respect to the cylindrical body 13a1.

Figure 6:
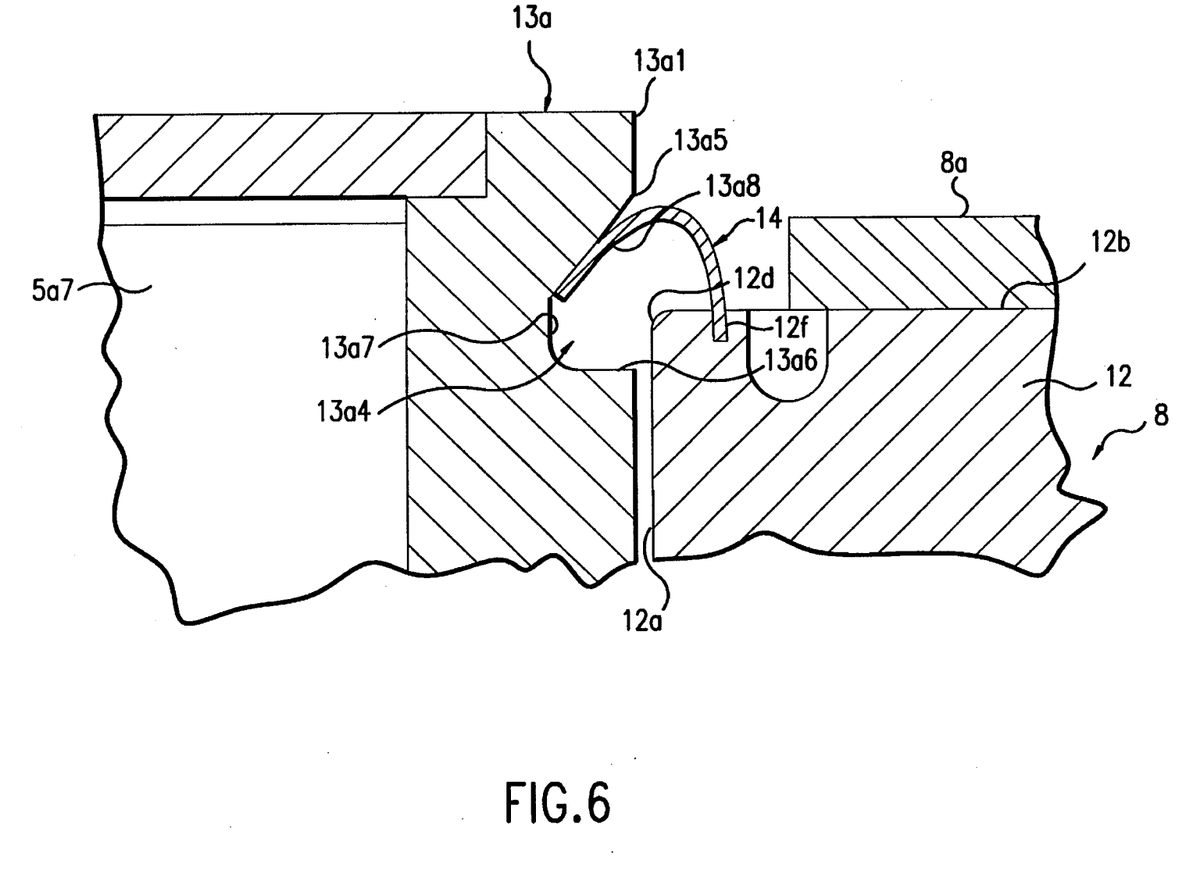
FIGS. 6 and 7 are respectively cross section and plan form details of a third embodiment of this invention.
Figure 7:
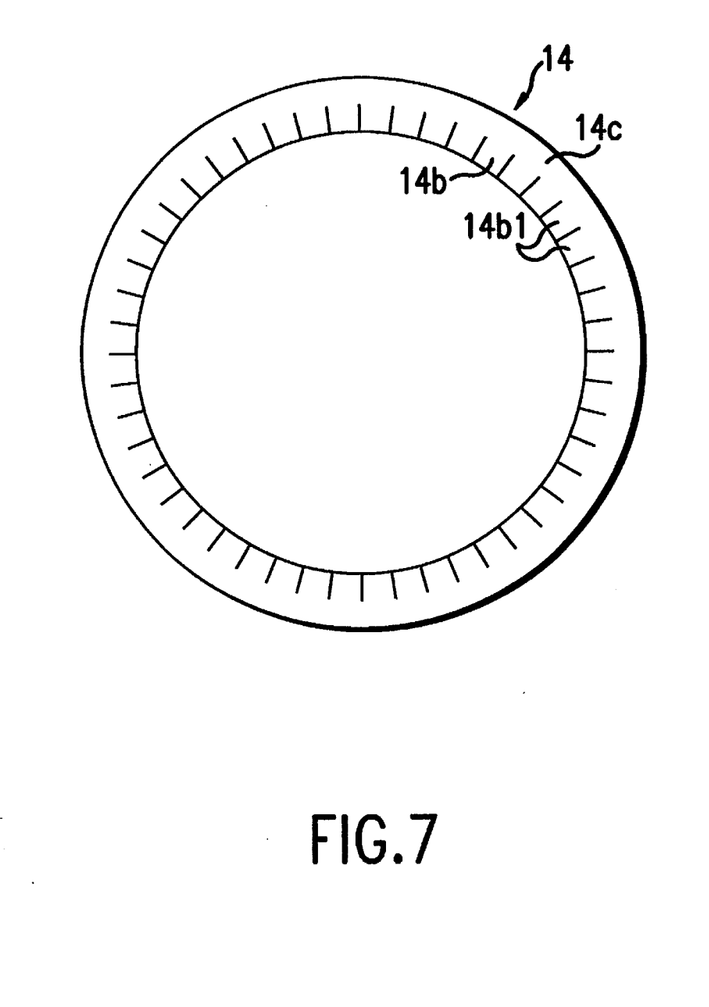

A third embodiment of the invention is seen in FIG. 6 and 7. Here again, parts in these figures corresponding to those of FIGS. 1, 2 and 3 bear like reference characters. In FIGS. 6 and 7 the ring 14 is fabricated of flexible sheet metal and, as seen in FIG. 6, is of inverted V shaped cross section, defining an inner conical surface 14b and an outer conical surface 14c. As seen in FIG. 7, the inner conical surface is defined by a plurality of radially disposed fingers 14b1. These fingers are of a length to extend into the upper vertex of the spring ring 14 outside of the cylindrical surface 13a1 of the cylindrical body 13a. The outer perpherial edge of this ring fits into a circumferential slot 12f in the upper surface 12b of the disk hub 12, in a position adjacent to and clear of the disk 8a. This spring ring 14 is installed by inserting a mandrel of slightly larger diameter than the diameter of the cylindrical body 13a into the spring ring 14. This deflects the fingers 14b radially outwardly. When the mandrel is positional concentrically of the upper end of the cylindrical body 13a, the spring ring may then be forced downwardly along the mandrel and onto the outer circumferential surface 13a1 of the cylindrical body to a position in which the spring ring 14 snaps into the circumferential groove 13a4. The outer peripheral edge of the spring 14 is then forced into the circumferential groove 12f in the disk hub 12. In this position the outer perpherial edge of the spring ring 14 couples an axial component of force and a radial component of force to the disk hub 12 to securely seat the disk hub 12 on the shoulder 13a2 at the base of the cylindrical body 13a and to center the disk hub 12 with respect to the cylindrical body 13a.

What is claimed is:

1. A hard disk assembly for a disk drive, comprising:
   a. a rotatable member having a substantially cylindrical body and a peripheral shoulder adjacent one end thereof;
   b. a disk hub having opposite hub faces and a central circular opening therethrough between said opposite hub faces, said circular opening of said hub having an upper circular edge at each hub face of said opposite hub faces, said cylindrical body projecting through said circular opening in said disk hub, one hub face of said opposite hub faces being seated upon said peripheral shoulder;
   c. at least one disk concentrically mounted to said disk hub;
   d. said cylindrical body having a circumferential groove therein having an upper circumferential groove edge, a lower circumferential groove edge, a circumferential groove bottom and an upper conical groove surface sloping downwardly and inwardly of said cylindrical body from said upper circumferential groove edge to said circumferential groove bottom, said lower circumferential groove edge being disposed below said upper circular edge of said circular opening in said hub, and
   e. a spring ring of hard material disposed in said circumferential groove and in contact ones with said upper conical groove surface and with said disk hub, said spring ring having a planform inside diameter which is less than the diameter of said cylindrical body and greater than the diameter of said circumferential groove bottom, said inside diameter of said spring ring being expandable to fit over said cylindrical body and to snap into said circumferential groove, said spring ring being retained by inwardly directed radial spring force in said circumferential groove in contact with said upper conical groove surface in said cylindrical body and in contact with said disk hub and applying a spring force to said hub, said spring force having an axial component acting on said hub for securing said hub to said, external peripheral shoulder of said cylindrical body.

2. The hard disk assembly according to claim 1, in which:
   a. said spring ring is of inverted substantially V-shaped configuration having an inner substantially conical surface and an outer substantially conical surface, said inner conical face comprising a plurality of flexible radial fingers the distal ends of which define said inner diameter of said spring ring, said fingers being radially deflectable to displace said distal ends of said fingers in a radial direction to increase said inner diameter to clear said cylindrical body, said fingers upon entering said circumferential groove in said cylindrical body springing back radially inwardly toward their undeflected position engaging said conical groove surface in said cylindrical groove and engaging said spring ring with the remaining hub face of said opposite hub faces of said disk hub.

3. The hard disk assembly according to claim 1, in which:
   a. said spring ring is a split spring ring of solid cross section which is radially resiliently expandable to fit about said cylindrical body and to snap radially inwardly into said circumferential groove engaging said split spring ring with said upper conical groove surface in said cylindrical body and with said hub at said upper circular edge of said circular opening.

4. The hard disk assembly according to claim 3, in which:
   a. said split spring ring is of circular cross section
   b. said split spring ring also applies a radial component of force to said hub for centering said hub with respect to said cylindrical body.

5. The hard disk assembly according to claim 3, in which:
   a. said split spring ring has an inner circumferential edge and an outer circumferential edge and is of wedge shaped cross section, increasing in thickness in a radial direction from said inner circumferential edge toward said outer circumferential edge and is wedged between said upper conical groove surface in said cylindrical body and said upper circular edge of said circular opening.

6. The hard disk assembly according to claim 5, in which:
   a. said wedge shaped cross section of said split spring ring is pointed downwardly into said circumferential groove.

7. The hard disk assembly according to claim 6, in which:
   a. said split spring ring comprises an upper conical ring surface in contact with said upper conical groove surface of said circumferential groove and a lower conical ring surface in contact with said upper circular edge of said circular opening in said disk hub.

* * * * *